US006449385B1

(12) United States Patent
Huber et al.

(10) Patent No.: US 6,449,385 B1
(45) **Date of Patent: *Sep. 10, 2002**

(54) DEVICE FOR IMAGE INSPECTION

(75) Inventors: Werner Huber, Rauenberg; Harald Bucher, Eschelbronn; Wolfgang Geissler, Bad Schoenborn; Bernd Kistler, Eppingen; Guenther Uhlig; Hans-Peter Grossmann, both of Dresden, all of (DE)

(73) Assignee: Heidelberger Druckmaschinen AG, Heidelberg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1014 days.

(21) Appl. No.: 08/643,597

(22) Filed: May 6, 1996

(30) Foreign Application Priority Data

May 4, 1995 (DE) ........................................ 195 16 352

(51) Int. Cl.[7] ................................................ G06K 9/00

(52) U.S. Cl. ........................ 382/112; 101/484; 356/392

(58) Field of Search ................................ 101/484–486, 101/365; 250/559.01–559.08; 382/112, 100, 141, 162, 173, 218, 181; 356/394; 460/621

(56) References Cited

U.S. PATENT DOCUMENTS

| | | | | |
|---|---|---|---|---|
| 5,014,618 A | * | 5/1991 | Zingher et al. | 101/365 |
| 5,187,376 A | * | 2/1993 | Hashimoto et al. | 250/559.02 |
| 5,317,390 A | | 5/1994 | Bolza-Schunemann et al. | |
| 5,712,921 A | * | 1/1998 | Zabele | 382/112 |

FOREIGN PATENT DOCUMENTS

| | | |
|---|---|---|
| DE | 4004056 A1 | 8/1991 |
| DE | 4321177 A1 | 1/1995 |
| DE | 4321179 A1 | 1/1995 |
| EP | 0 165 734 | 12/1985 |
| GB | 2 115 145 A | 9/1983 |

* cited by examiner

*Primary Examiner*—Jayanti K. Patel
(74) *Attorney, Agent, or Firm*—Laurence A. Greenberg; Werner H. Stemer; Gregory L. Mayback

(57) ABSTRACT

A device for inspecting a printed image of a product of a printing press, comprising an image detecting device that furnishes actual image data of the product, and a comparison circuit comparing the actual image data with master image data from a defect-free master image, dividing means for performing a preselectable division of the printed image into inspection areas, and wherein if a defect is detected by the comparison circuit the associated inspection area is designated as being defective.

8 Claims, 2 Drawing Sheets

DEVICE FOR IMAGE INSPECTION

BACKGROUND OF THE INVENTION

Field of the Invention

The invention relates to a device for inspecting the printed image of a product of a printing press.

Devices of this type serve to detect image defects, particularly in the inline mode of operation, in the printed image of a product produced by a printing press.

The known devices of this type have the drawback that inspection is performed manually and is time consuming, with the result that the printing press is slowed down, or that continued printing of faulty prints leads to waste of paper and other resources.

It is accordingly an object of the present invention to provide an image inspection device which overcomes the drawbacks of the known devices of this general type.

SUMMARY OF THE INVENTION

According to the invention, this object is attained in that the device has an image detecting device that furnishes actual image data of the product which are compared, by means of a comparison circuit, with nominal image data of a defect-free image subject, wherein a preselectable division of the printed image into inspection areas is made, and if a defect detected by the comparison circuit occurs the associated inspection area is designated. This embodiment according to the invention thus makes it possible to localize defects by means of the designated inspection area, which represents a distinct portion of the entire printed image; the entire printed image is inspected entirely in a multiplicity of inspection areas without overlapping. Attention is thus directed not merely to a single defect in the printed image resulting in removal of the associated sheet of paper, for instance by means of a spoiled-sheet bypass of the printing press; instead, concrete defect localization is performed; that is, the region (inspection area) in which the defect is located is designated. In this way, the location of the defect can be found very rapidly, and designation by means of the inspection area compared with high-precision indication of coordinates of the concrete location of the defect. The invention has the further advantage that substantially less effort must be exerted to produce the device; at the same time very good defect location detection is attained because the designation can be detected rapidly.

According to a further feature of the invention it may be provided that the inspection areas each have a square or rectangular outline. Preferably, the inspection areas are distributed in the manner of a grid over the surface of the printed image, with corresponding X and Y coordinates in terms of preferably a Cartesian coordinate grid.

Preferably, the width (x-coordinate) of each inspection area is equal in size to the respective zone width of color zones of an inking unit of the printing press. It is advantageous if the height (x-coordinate) of each inspection area is equal in size to the respective zone width of color zone of the inking unit of the printing press. For instance, if the printed sheet involved is of 102-type format with a zone grouping of 32.5 mm, then the total area is divided into 32×22 square inspection areas (X coordinate; Y coordinate).

It is advantageous if addresses are assigned to the inspection areas. On the basis of the addresses, the respective inspection area can be uniquely determined. Preferably, the addresses are first designated by a value on the X coordinate and then (separated by a comma, for instance) by a value on the Y coordinate. Thus "(1,1)" means the first width interval along the X axis and the first height interval along the Y axis, and hence the bottom left field on the printed sheet. "(32, 22)" accordingly designates the top right inspection field of the printed image of a printed sheet.

Preferably, each address of the inspection areas is assigned at least one memory cell of a memory, wherein a value that corresponds to the outcome of inspection of the associated inspection area is written into the memory cell. It is thus possible for instance to write the value "0" into the memory cell if the associated inspection area is defect-free, or in other words the actual image data compared with the command image data of a defect-free image subject show no deviation, or only deviations within an allowable tolerance threshold, so that freedom from defects can be presumed. If in one or several inspection areas there is at least one defect that has been detected in the nominal/actual comparison from the fact of exceeding of the tolerance threshold, then the value "1" is written into the memory cell of the memory assigned to that inspection area, and this value thus designates a defect. The memory can thus be made quite simple in layout, since it need merely have a number of memory cells that matches the number of inspection areas.

The size of the inspection areas may naturally be specified from one printing job to the next or even changed during one printing job. The larger the number of inspection areas, the finer the defect detection grid. The grid formation may preferably be done as a function of the image subject; that is, a simple printed image does not require fine screening but instead is satisfactorily detectable for the sake of defect detection by means of even a coarse grid of inspection areas. Complicated subjects should instead be covered by a closely spaced grid.

In a further feature of the invention, to form the inspection areas, the pixels representing the printed image in the X and Y coordinate directions are divided by the predeterminable number of pixels per inspection area in the X and in the Y direction. The entire printed image is composed of many pixels which are distributed in the X and Y directions. Superimposed on this pixel structure is the imaginary grid of inspection areas. Within one inspection area, a certain number of pixels are located in the X direction and a certain number in the Y direction. If the entire number of pixels with respect to the X coordinate is divided by the number of pixels in the X coordinate direction of an inspection area, or in other words if integer division occurs, then the number of inspection areas located along the X coordinate direction is thus defined. A corresponding determination of the number of divisions in the Y direction is attained by dividing the total number of pixels in the Y direction by the number of pixels in the Y direction within one inspection area.

It is advantageous if the address of an inspection area affected by a defect or more than one defect is ascertained by means of a locating circuit, which calculates the modulo of the pixel coordinates of the location of the defect, i.e. of the number of pixels of the width and height of an inspection field. In this way, the affected inspection area can be dismissed very simply. The following example will serve, in which the numbers given do not match actual practice but instead have been chosen for the greatest possible simplicity: the total number of pixels of the printed image in the X direction is 500, with each of the inspection areas having a width of 50 pixels. In the Y direction, there are 300 pixels, and once again the height of each inspection area is 50 pixels. Hence 10×6=60 inspection areas are formed in the X times Y direction.

If a defect is now located for instance at the pixel that corresponds to the X coordinate 275 and the Y coordinate 125, and if these pixel coordinates are calculated as modulo of the number of pixels of the width and height (50 in each case) of a inspection area, then the result in the X coordinate direction is 275/50=5 with a remainder of 25, and in the Y coordinate direction 125/50=2 with a remainder of 25. After adding 1, the defect is located in the sixth inspection area from the right, specifically in the third row of rows of inspection areas located one below the other; thus this inspection area has the address (6,3). The remainder of 25 discarded in each case is not of any significance in determining the defect by means of the inspection areas; it designates the number of pixels, in each case calculated from the corresponding boundary of the associated inspection area. Finally, it is advantageous if the address of an inspection area having a defect is used to designate the associated inspection area on a display, for instance on a monitor. By means of this address, for instance, the printed image or command image shown on a monitor can be designated, in that the associated inspection area is designated, for instance by means of an overlay frame.

With the foregoing and other objects in view there is provided, in accordance with the invention, a device for inspecting a printed image of a product of a printing press, the device including an image detecting device that furnishes actual image data of the product, and a comparison circuit for comparing the actual image data with master image data from a defect-free master image, dividing means for performing a preselectable division of the printed image into inspection areas, and wherein if a defect is detected by the comparison circuit the associated inspection area is designated as being defective.

In accordance with another feature of the invention, the inspection areas each have one of a square or rectangular outline.

In accordance with a further feature of the invention, the image is divided into ink zones, each ink zone having a respective zone width, each inspection area having sides in x-direction being equal to the respective ink zone width of color zones of an inking unit of the printing press.

In accordance with an added feature of the invention, each inspection area has a height in y-direction being equal to a respective ink zone width of the color zone of an inking unit of the printing press.

In accordance with again an additional feature of the invention, an address is assigned to each inspection area.

In accordance with yet another feature of the invention, each address of the inspection area is assigned at least one memory cell of the memory, wherein a value that corresponds to the outcome of inspection of the associated inspection area is written into the memory cell.

In accordance with yet a further feature of the invention, the inspection areas are divided into pixels, the pixels (X, Y) representing the printed image in the X and Y coordinate directions, each inspection area being divided by a predeterminable number of pixels ($M_x$, $M_y$) in the X and in the Y directions.

In accordance with yet an added feature of the invention, the address of an inspection area affected by a defect is ascertained by means of the locating circuit, the locating circuit being operative for calculating the pixel coordinates (X, Y) of the location of the defect modulo of the number of pixels of the width and height of an inspection field.

In accordance with yet a concomitant feature of the invention, the address of an inspection area having a defect, and designating means operative for designating an associated inspection area on a display.

Other features which are considered as characteristic for the invention are set forth in the appended claims.

Although the invention is illustrated and described herein as embodied in a device for image inspection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
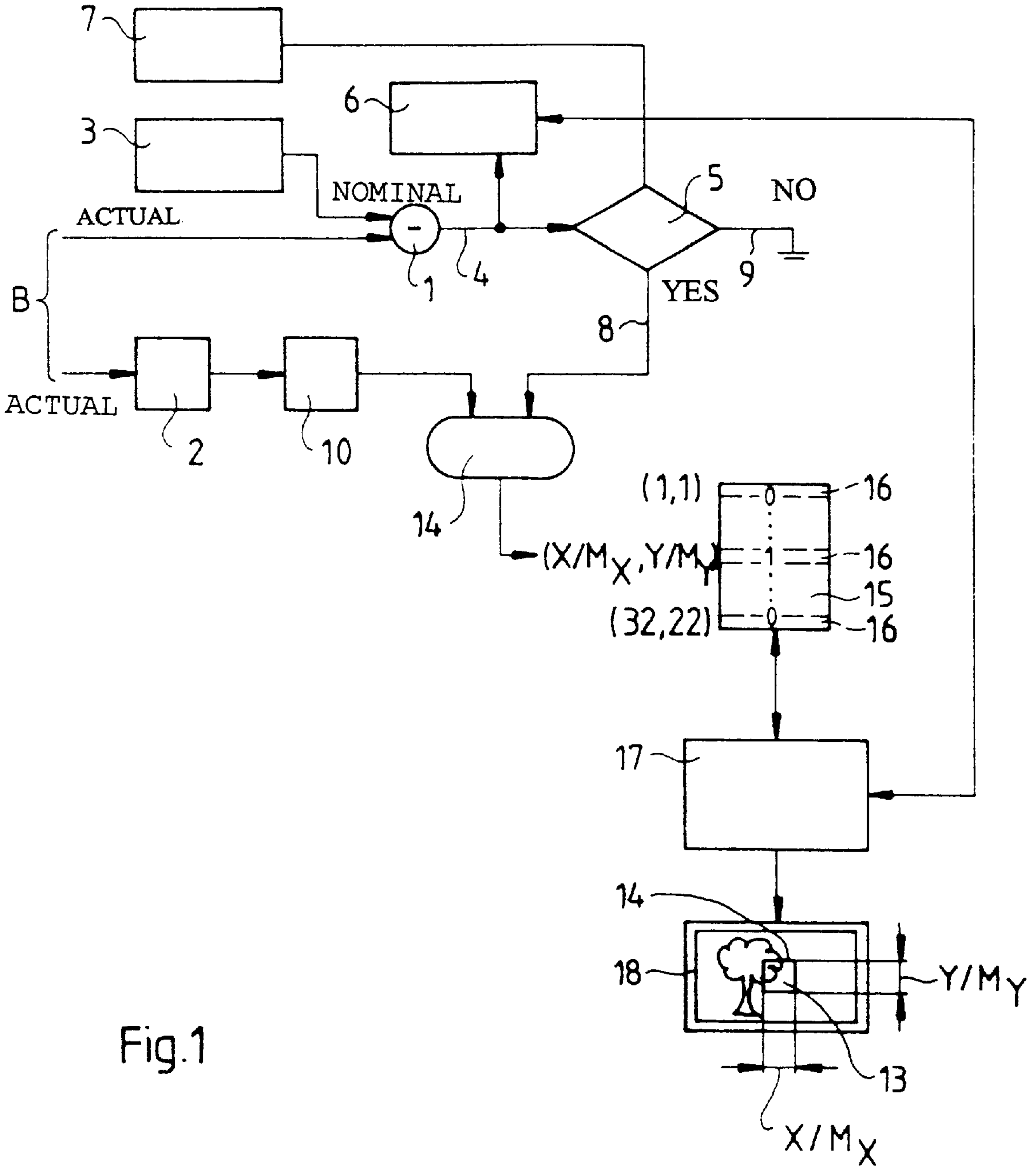
FIG. 1 is a block diagram of the layout of the device for image inspection.

The device for image inspection shown in FIG. 1 has an image detecting device B, not shown in further detail, which is constructed as a camera and ascertains actual image data from the printed image of a product of a printing press, not shown. This detection of actual image data occurs during printing operation, or in other words in the inline mode. The actual image data are supplied on the one hand to a comparison circuit 1 and on the other to a counter 2. The comparison circuit 1 receives nominal image data, as a further input variable, from a memory 3. The comparison circuit 1 performs a nominal/actual data comparison, and at its output 4 if there is a deviation between the nominal and actual data it furnishes defect data F, which are supplied to a threshold circuit 5 and a differential image data circuit 6. Also connected to the threshold circuit 5 is a threshold data circuit 7. If the defect data F exceed a threshold that can be specified by means of the threshold data circuit 7, then a corresponding signal is output at the output 8 of the threshold circuit 5. If there is no defect, or if the deviations present are less than a predeterminable threshold, no data output is performed at the output 8. This status is designated by the output 9 marked "no".

Figure 2:
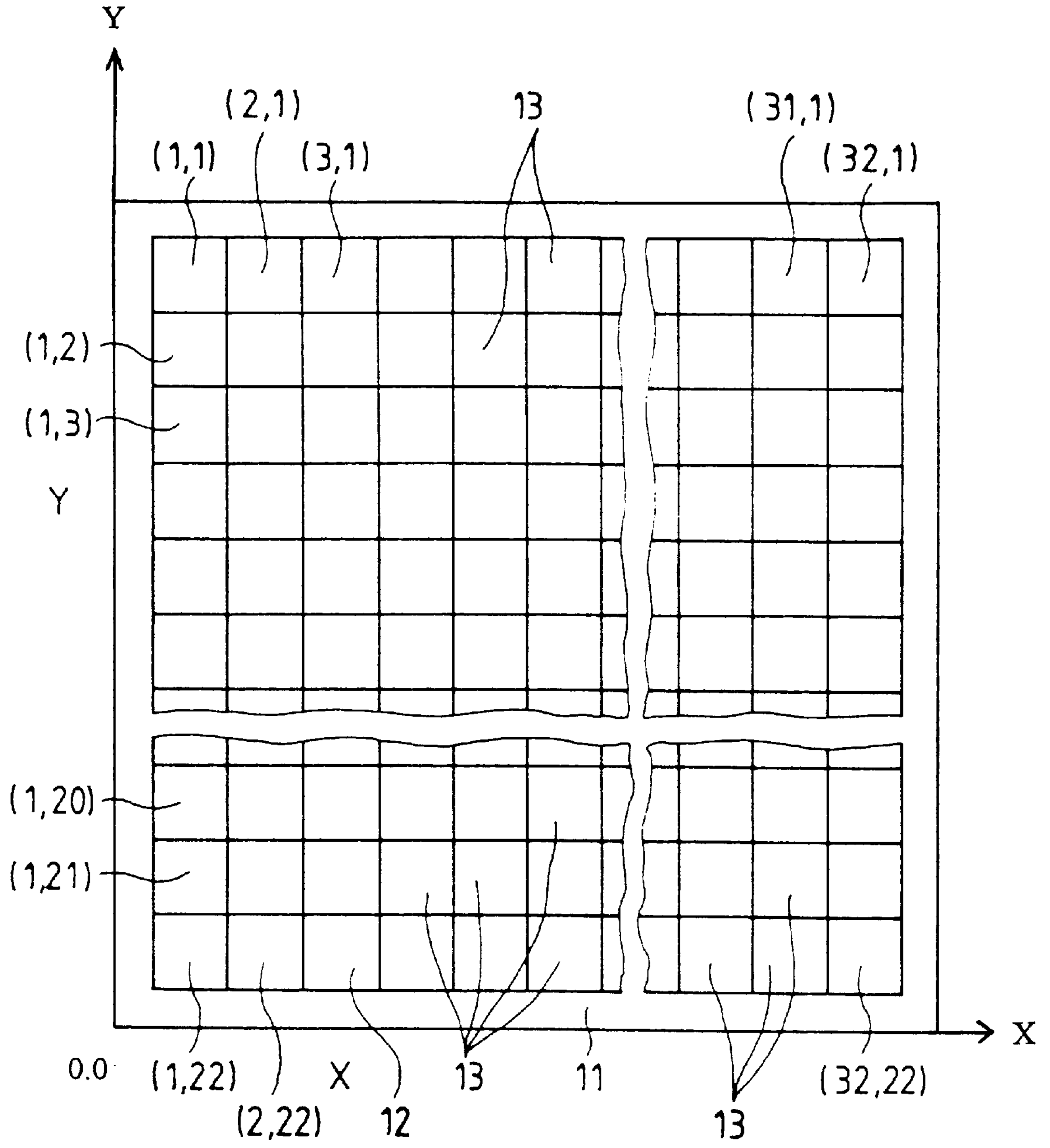
FIG. 2 is an image subject divided into inspection areas.

The counter 2 has an X counter and a Y counter, each of which counts the pixels of the actual image data as scanned by the camera in the X coordinate direction and the Y coordinate direction. Reference numeral 10 indicates a modulo circuit, which performs addressing that will be discussed in further detail hereinafter. Reference numeral 11 (FIG. 2) indicates a product, namely a sheet of paper, which has a printed image 12 that has been produced by a printing operation by the printing press, not shown. The printed image 12 is subdivided into inspection areas 13 of preselectable size, which are disposed in the manner of a grid with corresponding X and Y coordinates, as shown in FIG. 2.

As already explained at the outset, the widths and heights (X and Y directions) of the various inspection areas 13 can correspond to the zonal grouping of color zones of the printing unit or printing units of the printing press. For instance, 32 inspection areas in the X direction and 22 inspection areas in the Y direction are provided, or in other words a total of 32×22 inspection areas arranged in rows, which among them divide up the total subject. The image subject is composed of closely spaced pixels in the X and Y directions; the number of pixels per inspection area 13 is $M_x$ in the X direction and $M_y$ in the Y direction. The total number of pixels in the X direction corresponds to the value X, and the total number of pixels in the Y direction of the subject of the printed image 12 corresponds to the value Y; the values X and Y are detected by the counting circuits of the counter 2. If by means of the modulo circuit 10 the number of pixels X and Y detected in scanning of the printed image 12 is divided by the number $M_x$, and $M_y$, respectively, of an inspection area 13, then the result with respect to the integer position corresponds to an address in the X and Y directions, which designates the corresponding inspection area. If the address supplied to a gate circuit 14 is carried to a memory 15, the memory 15 having memory cells 16 such that one memory cell 16 is assigned to each inspection area 13, then in accordance with the operation of scanning the printed image and the inspection area matrix thus passed through, the corresponding memory cell 16 is triggered addresswise. If in such triggering the threshold circuit 5 furnishes a signal that represents a defect at its output 8, then the value "1" is written into the corresponding memory cell 16. If an address whose associated inspection area 13 has no defect is active, then the value "0" is entered in the corresponding memory cell 16. The result overall is that the contents of the memory 15 represent a copy of the defect events in accordance with the inspection areas 13. The designation (1,1) of the memory 15 in FIG. 1 means that this is the memory cell 16 that—in the example shown—has no defects, because the value "0" is indicated there. The last inspection area 13, which in the exemplary embodiment is also defect-free because it has the value "0", is designated by (32,22). A memory cell 16 located between these two end memory cells 16 has the value "1"—as shown—and the address ($X/M_x$, $Y/M_y$), which thus represents a discovered defect, for instance caused by a blib. The memory 15 communicates with a processor 17 that cooperates with a monitor 18. There is also a connection between the differential image data circuit 6 and the processor 17 for transmitting differential image data between the processor 7 and the differential image data circuit 6.

On the monitor 18, the printed image of the product of the printing press detected by the image detecting device is shown. By means of the memory 15, information is carried to the processor 17 so that a defect that has been detected is shown on the monitor 18, for instance by having its associated inspection area 13 designated by means of an overlay frame 14. In other words, whichever inspection area 13 has a defect located in it shows up on the monitor 18. If there are a plurality of defects, then the corresponding inspection areas 13 are displayed. The overlay frame display represents merely one possible embodiment. It is naturally also possible to choose other types of defect display.

Overall, what is performed in pixel-oriented fashion is a master/actual comparison between the printed image produced and a defect-free master image; in the ongoing process, the location coordinates of the correspondingly examined pixel are known at all times. If a deviation that is greater than an adjustable threshold is found during this master/actual comparison, then the associated sheet of paper is designated as defective. This is done regardless of how many pixels on the sheet have exceeded the predetermined threshold. In particular, provision may be made so that after complete measurement, the corresponding sheet of paper is rejected, via for instance a defective sheet outlet. The address—of the inspection area affected by the defect—is stored in memory and serves in a simple way to make the location of the defect locatable by means of a display, for instance on a monitor. In the memory 15, those memory cells 16 that are assigned to an inspection area 13 that has a defect are designated by a flag, so that the memory contents represents a copy of the defects of the associated printed image of the printed product. By means of a higher-ranking circuit, which in the exemplary embodiment is designated as a computer, namely the processor 17, the addresses can be used to designate, on a display of the master image or the actual image, for instance the monitor image, the affected inspection areas that have defects. A further action may comprise transmitting only that portion of a differential image (master/actual deviation) whose contents are not equal to zero or in other words are affected by defect, to the computer or the monitor, using the existing coordinates (addresses). In this way, although the actual image is displayed, nevertheless this is done only regionally, and the result of this data selection is faster processing, which is advantageous for ensuing (software) operations, for instance, such as detailed defect analysis.

Inspection areas can also favorably be used to speed up control operations. For instance, by "clicking" on an inspection area on the master or actual image shown on the monitor, an action can be tripped, such as blocking off this region of the image for the inspection.

We claim:

1. A device for inspecting a printed image on a printed sheet in a sheet-fed printing press, comprising:

a monitor for displaying a multi-colored printed image;

an image detecting device that furnishes actual image data of a printed sheet, and a comparison circuit comparing the actual image data with master image data from a defect-free master image, dividing means for performing a preselectable division of the multi-colored printed image into inspection areas, and wherein if a defect is detected by the comparison circuit the associated inspection area is designated as being defective and displayed on the monitor; and an overlay frame wherein the associated inspection area of the defect of the multi-colored printed image is designated on the monitor by said overlay frame.

2. The device of claim 1, wherein the inspection areas each have one of a square or rectangular outline.

3. The device of claim 1, wherein the image is divided into ink zones, each ink zone having a respective zone width, each inspection area having sides in x-direction being equal to the respective ink zone width of color zones of an inking unit of the printing press.

4. The device of claim 1, wherein each inspection area has a height in y-direction being equal to a respective ink zone width of the color zone of an inking unit of the printing press.

5. The device of claim 1, wherein an address is assigned to each inspection area.

6. The device of claim 5, including a memory having memory cells, wherein each address of the inspection area is assigned at least one memory cell of the memory, wherein a value that corresponds to the outcome of inspection of the associated inspection area is written into the memory cell.

7. The device of claim 1, wherein the inspection areas are divided into pixels, the pixels (X, Y) representing the printed image in the X and Y coordinate directions, each inspection area being divided by a predeterminable number of pixels in the X and in the Y directions.

8. The device of claim 1, including a locating circuit, wherein the address of an inspection area affected by a defect is ascertained by means of the locating circuit, the locating circuit being operative for calculating the pixel coordinates (X, Y) of the location of the defect modulo of the number of pixels of the width and height of an inspection field.

* * * * *